Dec. 27, 1966  H. SHAPIRO  3,294,997
AXIAL AIR GAP MOTOR
Filed Sept. 10, 1963  7 Sheets-Sheet 1

INVENTOR.
HARRIS SHAPIRO
BY Brumbaugh, Free,
Graves & Donohue
ATTORNEYS

Dec. 27, 1966 H. SHAPIRO 3,294,997
AXIAL AIR GAP MOTOR
Filed Sept. 10, 1963 7 Sheets-Sheet 2

INVENTOR.
HARRIS SHAPIRO
BY Brumbaugh, Free
Graves & Donohue
ATTORNEYS

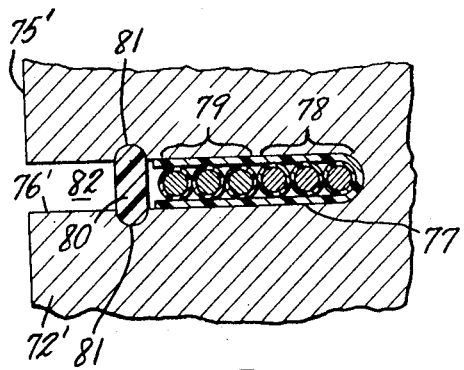
FIG. 5
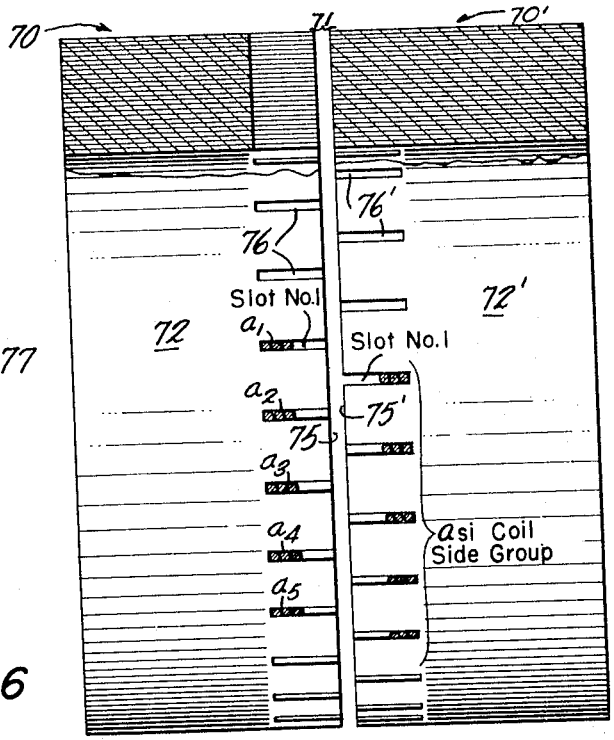
FIG. 6
FIG. 9
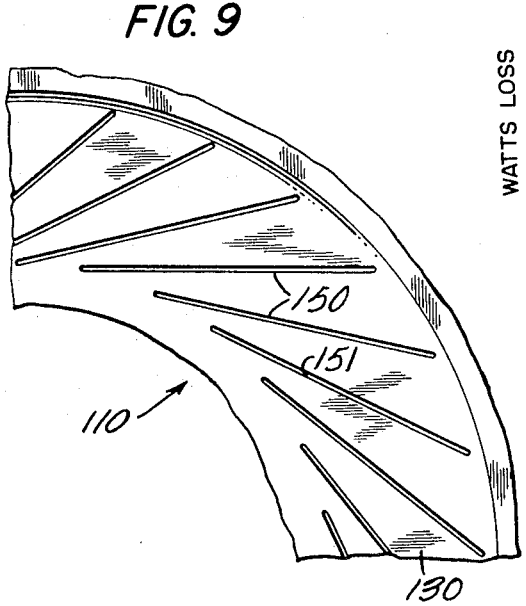
FIG. 8
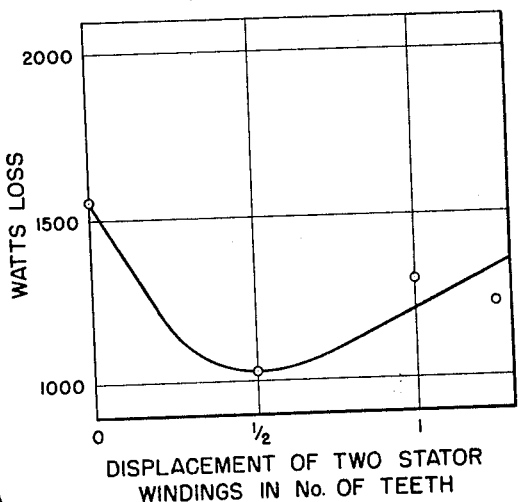
INVENTOR.
HARRIS SHAPIRO
ATTORNEYS

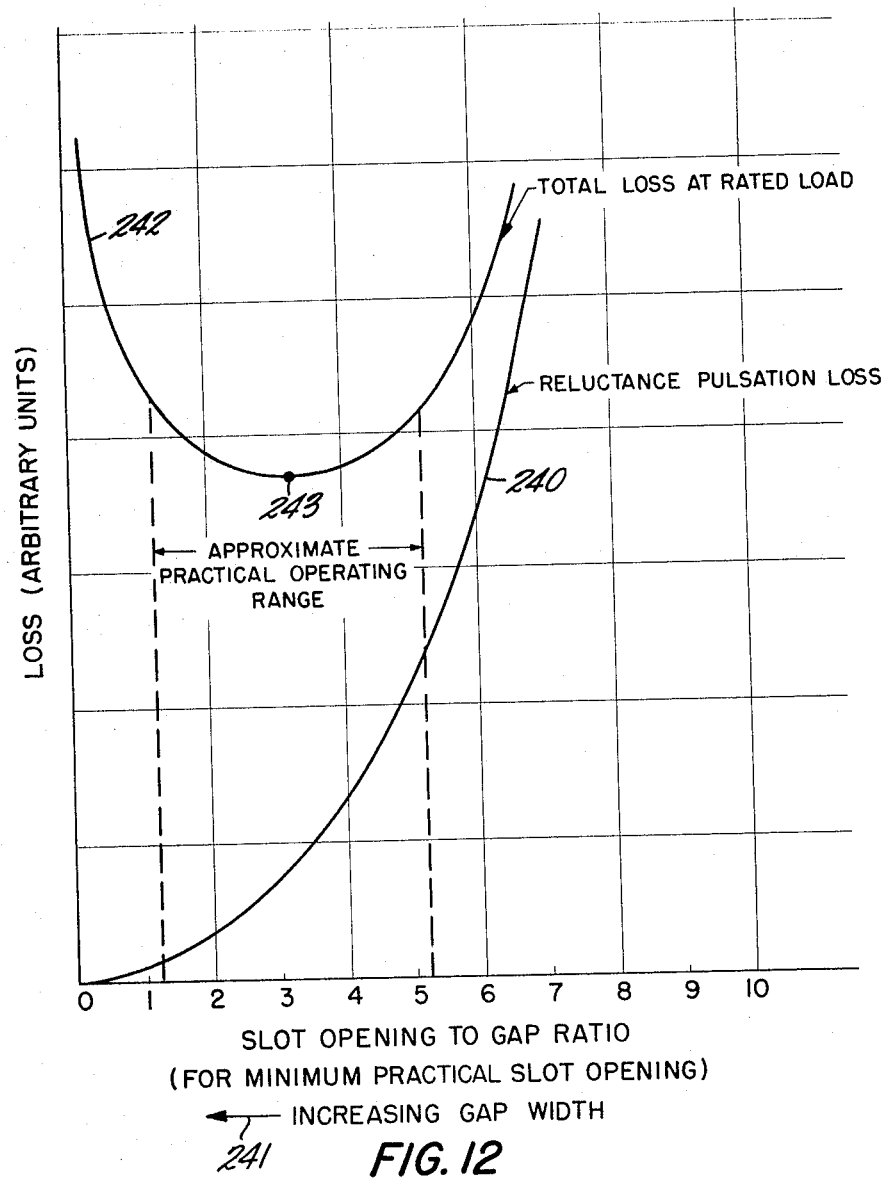

United States Patent Office 3,294,997
Patented Dec. 27, 1966

3,294,997
AXIAL AIR GAP MOTOR
Harris Shapiro, Englewood, N.J., assignor to General Dynamics Corporation, New York, N.Y., a corporation of New York
Filed Sept. 10, 1963, Ser. No. 308,013
Claims priority, application Italy, Oct. 6, 1962, 19,441/62, Patent 692,952
7 Claims. (Cl. 310—268)

This invention relates to single and double axial air gap motors and to certain electrical improvements in such a motor.

This application is a continuation-in-part of my Patent No. 3,223,867, issued Dec. 14, 1965.

An object of this invention is to reduce losses in polyphase induction axial air gap motors.

These and other objects are realized according to the invention as follows. Stray rotor losses from M.M.F. space harmonics are reduced to insignificant levels by employing polyphase winding configurations characterized by fractional-pitch coils arranged to provide a variable distribution among successive stator slots of the turns of wire carrying current of any particular phase. Such distribution is adapted in conjunction with the fractional pitch of the coils to attenuate greatly the significant loss-producing M.M.F. space harmonics. Stray rotor losses due to reluctance pulsations are reduced by employing a selected value or range of values for the ratio of the stator slot opening width to the width or size of the gap between the magnetic material of the stator and the electroconductive material of the rotor.

For a better understanding of the invention, reference is made to the following detailed description of exemplary embodiments thereof, and to the accompanying drawings wherein:

FIG. 5 is an enlarged view (taken in a chordal cross section through one of the FIG. 1 stators) of the details of a stator slot and of the elements contained by such slot;

FIG. 6 is a schematic front elevation of the two stators of the FIG. 1 motor when such stators have been relatively rotated to shift the fields produced thereby from an exact opposed phase relation;

FIG. 7 is a detailed fragmentary view of one half of the rotor of the motor of FIG. 1;

FIG. 8 is a graphical diagram of the reduction in power loss effected by a relative rotation of the stators such as is shown in FIG. 6;

FIG. 12 is a graphical diagram of the effect on motor losses of the ratio of stator slot opening width to rotor-stator flux gap width.

Figure 1:
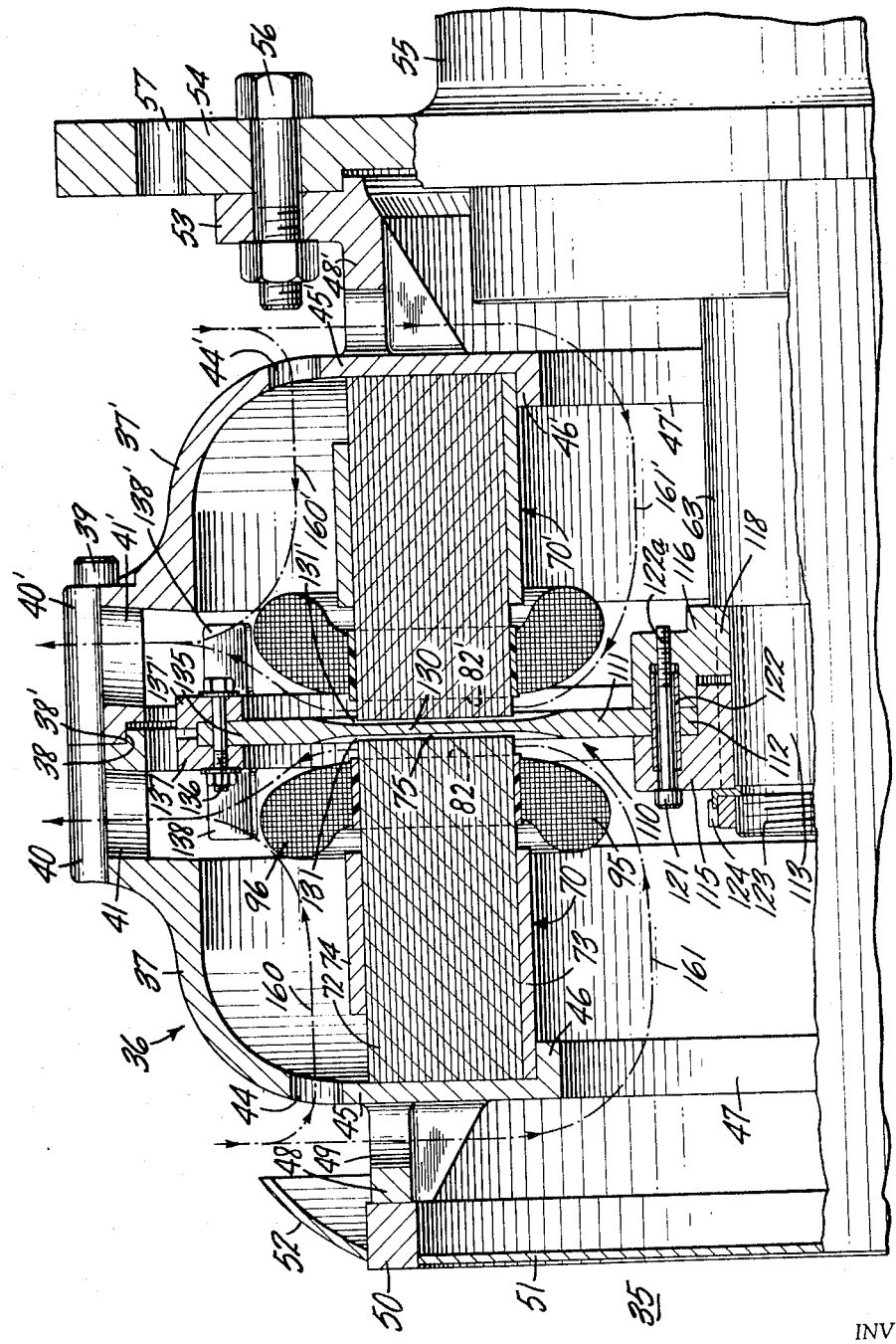
FIGURE 1 is a view in cross section of one-half of a double axial air gap motor whose construction is symmetrical about the axis of the shaft thereof.

For convenience of illustration, the axis of the motor is shown in the above figures as being horizontal. In many applications, however, such axis would be vertical.

In the description which follows, those elements of the described motor which are counterparts of each other are designated by the same reference numbers. Such counterpart elements are, however, distinguished from each other in designation by employing different suffixes (such as a prime ('), a special subscript designation or the like) in conjunction with their common reference numeral. Unless the context otherwise requires, the description hereinafter, of one of such counterpart elements is to be taken as also applying to all other elements having the same reference numeral.

Referring now to FIG. 1, the numeral 35 generally designates a double axial air gap motor having a housing 36. Such housing is comprised of left and right hand hollow, rounded casings 37, 37', of which an outwardly facing, circular shoulder 38 on the former mates with an inwardly facing circular shoulder 38' on the latter to provide a peripheral overlap of the casings in the axially central region of the motor. The two casings are fastened together by axial bolts 39 spaced equiangularly around the motor and passing through bolt holes (not shown) in casing 37' into registering threaded bolt holes (not shown) extending into casing 37. Around the bolt holes therein, the casing 37 is thickened for reinforcing purposes, such thickening producing a number of prominences 40 equiangularly spaced around the periphery of the casing. Intervening those prominences the casing 37 has formed therein a number of air outlet vents 41. As shown, the right hand casing 37' has similar prominences 40 (axially registering with prominences 40) and similar vents 41'.

From its axially central portion, the casing 37 curves inwardly to a portion thereof in which are formed a plurality of equiangularly spaced air inlet ports 44. Radially inwards of those ports, the casing is shaped to provide a radially flat wall 45 terminated at its inner margin by an in-turned annular lip 46 surrounding a circular opening 47 to the interior of the motor. Secured to the outside of wall 46 is a ring-shaped mounting member 48 radially perforated by a plurality of air inlet ports 49 spaced at angular intervals around the member. The left hand end of the motor is closed by a cover assembly comprised of: (a) A fastening ring 50 bolted (by bolts not shown) to the member 48; (b) a circular cover plate 51 joined around its periphery to the inside of ring 50, and (c) an annular cowling 52 disposed around and secured to such ring.

The description just given of casing 37 applies also to right hand casing 37' excepting that the ring member 48' of such right hand casing terminates at its right hand end in an out-turned flange 53. That flange permits a fastening of the FIG. 1 motor to the flange 54 of a load device 55 by axial bolts 56 passing through both flanges. As shown, the flange 54 extends radially outward of flange 53 and has formed therein a plurality of bolt holes 57 for securing the motor-load device assembly to some sort of support. Thus, on board ship the assembly may be fastened to the deck by bolts passed through those bolt holes, the axis of the motor and load device being vertical, and the load device being received in a suitable well formed in the deck.

Figure 2:
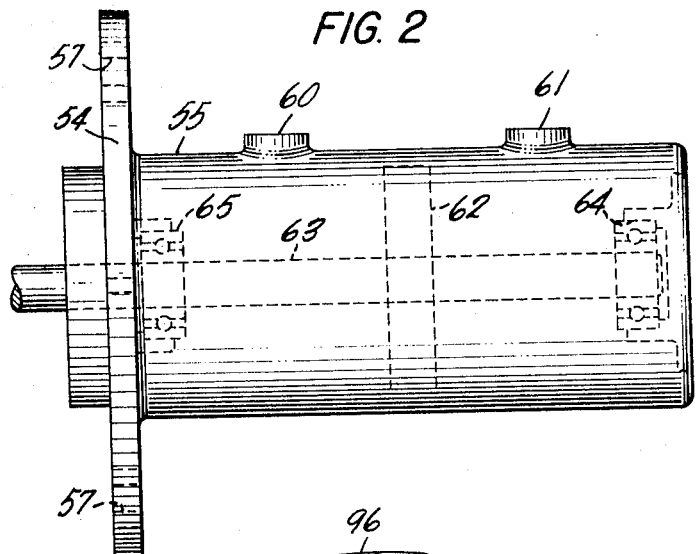
FIG. 2 is a schematic view in front elevation of a load device for the motor of FIG. 1.

Referring now to FIG. 2, while the load device 55 for motor 35 may be an electrical generator, a fan or any other device providing a rotary load, the device 55 is shown schematically herein as being a turbo-pump having a fluid inlet 60, a fluid outlet 61 and a rotary pumping element 62 driven by a shaft 63 which is common to the pump 55 and to the motor 35. Comparing FIGS. 1 and 2, it will be seen that a length of the shaft 63 projects from the pump into the motor to extend to the axially central region of the latter.

The shaft 63 is rotatably supported in pump 55 by two conventional bearing assemblies disposed at opposite axial ends of the pump. The length of shaft 63 in motor 35 does not have any support of its own but is supported entirely by the bearings 64, 65 within the pump.

The stator means of motor 35 is comprised (FIG. 1) of left-hand and right-hand annular stators 70, 70′ coaxial with the shaft 63 and axially spaced from each other to be separated by an inter-stator gap 71 (FIG. 6). Since the two stators are similar in structure, only that of the left-hand stator 70 will be described in detail.

The core 72 of stator 70 is formed of steel tape which is spirally wound on a tubular mandrel 73, and which is surrounded by a restraining ring 74. Such core 72 is welded or otherwise secured to the wall 45 of left-hand motor casing 37.

As shown (FIG. 3), the stator core 72 is of annular form and has an annular, planar front face 75 which borders the left-hand side of the inter-stator gap 71. That face 75 has milled therein thirty radial slots generally designated by the reference numeral 76, the slots being spaced around the face at 12° intervals.

Referring to FIG. 5 (which shows the details of a slot for the right-hand stator core 72′), a folded-over sheet 77 of insulation (e.g., "Mylar") is inserted in the bottom of each slot. The pocket formed in such insert contains an inner group 78 of three wire turns forming an active side of a winding coil, and, also, an outer group 79 of three wire turns forming an active side of another winding coil. The two coil sides are locked into the slot by an insulating wedge 80 received in lateral notches 81 formed in the slot. As shown, such wedge is disposed inwardly of the mouth of the slot by an amount greater than the slot width. Accordingly, the front end of the slot forms in the annular front face of the stator core a recessed air passageway extending radially between the inner and outer cylindrical surfaces of the core and having a greater depth than width. The radial passageways so provided by the stator slots are useful for reasons later discussed.

Figure 4:
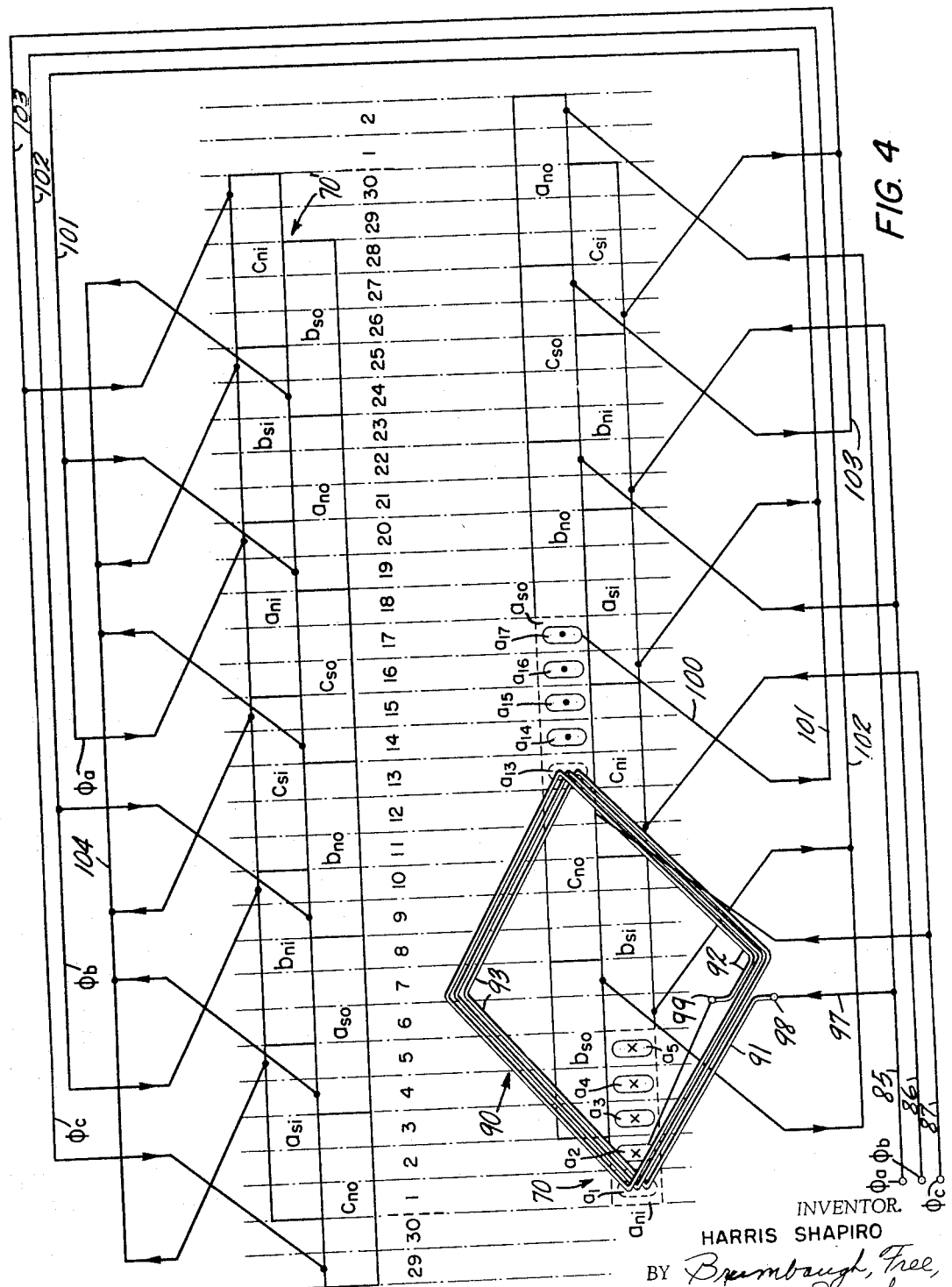
FIG. 4 is a developed schematic view of the mode of winding and electrical interconnection of the two stators of the FIG. 1 motor when the fields produced by those stators are in exact phase opposition.

FIG. 4 is a schematic developed view, looking radially inward, of the windings on stators 70, 70′ and of the electrical interconnections of those windings. The thirty slots in stator 70 and the corresponding thirty slots in stator 70′ (each slot in one stator being paired with one particular slot in the other) are respectively designated by the reference numerals 1–30 extending in a horizontal row across FIG. 4. Each slot contains an inwardly disposed active side of a winding coil and an outwardly disposed active side of another winding coil. Both stator windings are polyphase windings, the term "polyphase" being used herein in its usual sense in the electrical art (and in contradistinction to mere "multiple phase") as referring to a plurality of phases of which each has, ideally, equal phase displacement from the next-preceding and the next-succeeding phase, the amount of such phase displacement being the same for all phases.

The thirty inwardly disposed active coil sides of stator 70 are fed by one or the other of phases $a$, $b$ and $c$ of a three phase current supply provided by cables 85, 86 and 87. Those last named coil sides are divided into six groups each comprised of five successive coil sides and designated from left to right in the figure as coil side groups $a_{ni}$, $b_{si}$, $c_{ni}$, $a_{si}$, $b_{ni}$, and $c_{si}$. The reference letter for each of those coil side groups indicates the phase by which the coil sides in that group are fed. Further, the subscript suffixes $n$ and $s$ designate that the instantaneous flow of current through the coil sides of the designated group is considered as being in the direction of, respectively, radially inward and radially outward through the slots in which the coil sides of the group are laid. The subscript suffix $i$ is used to indicate that the coil sides of the groups designated by $i$ are inwardly disposed within the slots in which such coil sides are received. In contrast, the suffix $o$ indicates that the coil sides to which it pertains are outwardly disposed within the slots in which such coil sides are received.

The active coil sides in the slots of each stator are parts of coils of which there are thirty per stator, and of which an exemplary one is the coil 90 represented schematically in FIG. 4. Such coil is formed by the winding of a continuous insulated wire 91 into three bundled loops or turns of a shape to divide the coil into two separate straight line segments $a_1$ and $a_{13}$ and into two end extensions 92 and 93 disposed between those two segments at opposite radial ends of the coil.

Figure 3:
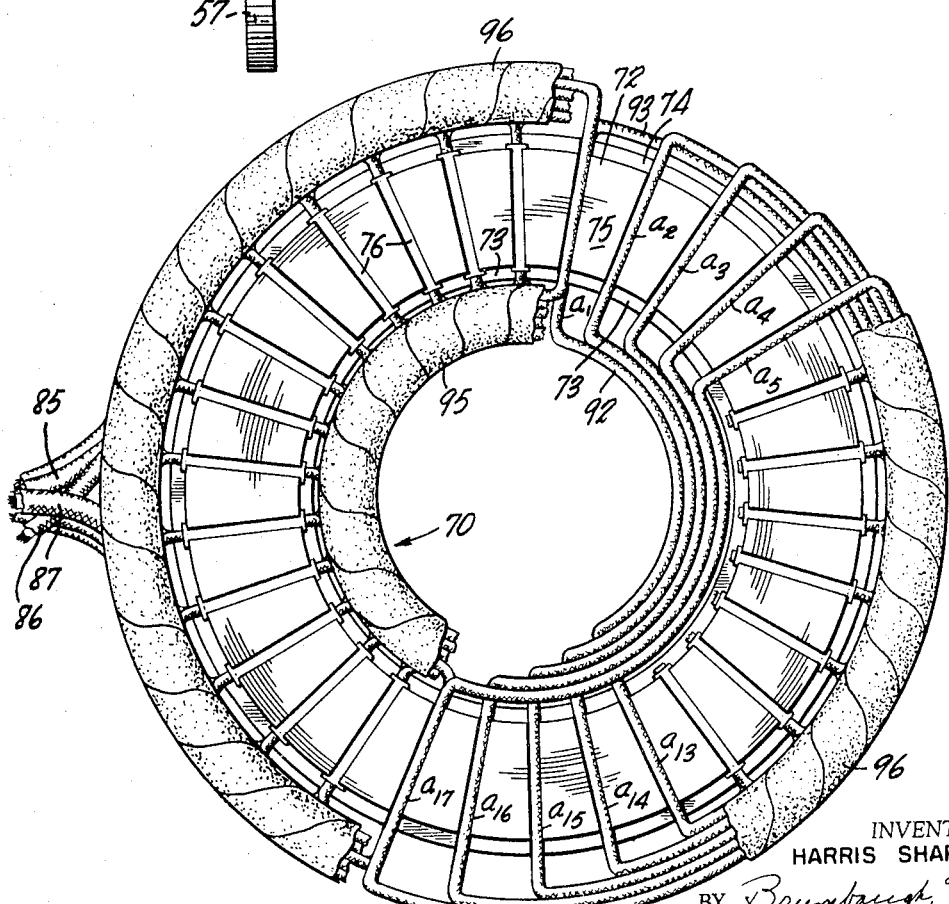
FIG. 3 is an end elevation of the front face of one of the wound stators of the motor of FIG. 1.

FIG. 3 illustrates the individual structure and mutual arrangement in a structural sense of the thirty coils on stator 70. As shown by the last named figure, the radially inner end extensions of the several coils are bound together to form an inner annular band 95. Similarly, the radially outer end extensions of such coils are bound into an outer annular band 96.

The windings of the stator 70 and 70′ are electrically connected with the three phase supply and with each other in the manner shown in FIG. 4. The cables 101, 102, 103 are respectively connected to the coil groups of phase $a$, $b$ and $c$ of stator 70′ to pass current therethrough in a manner which is generally analogous to that by which current is passed through the coil groups of stator 70, but which differs in the respect that all currents in the windings on stator 70′ terminate at a common junction 104.

To summarize briefly the foregoing discussion of FIG. 4, each of stators 70 and 70′ has thereon a polyphase, lap-wound, fractional-pitch, distributed winding adapted to generate a revolving magnetic field in the inner stator gap 71 between the two stators. The respective distributions of the coil groups in the two stator windings are such that the two fields which are respectively produced thereby are of the following character. First, both fields are two-pole fields, although, if desired, the stators may be wound to produce fields both having a greater, even, like number of poles as, say four or six poles. Second, the stators are so wound, that, looking in one direction along the axis of the motor shaft (e.g., in the direction toward pump 55), both fields have the same direction of rotation around that axis. Third, the two stators are so wound that when slot 1 of stator 70 has the disposition shown in FIG. 4 of being directly opposite slot 1 of stator 70′, the fields of the two stators are exactly opposed in space phase relation. By this is meant that the intensity peak of fundamental north flux in the revolving field of stator 70 is directly opposite the intensity peak of fundamental south flux in the revolving field of stator 70′, the two fields elsewhere having flux distributions such that a given intensity value of fundamental flux belonging to one field registers with an equal intensity value of opposite polarity fundamental flux belonging to the other field. The relative disposition of stators 70, 70′ which yields that exact opposed phase relation between the two fields has been shown in FIG. 4 merely to facilitate the disclosure since, as pointed out hereafter, better results are obtained when some degree of angular misregistration exists between the two stators, and when, accordingly, the two fields depart somewhat from being exactly opposed in phase.

Returning to FIG. 1, axially disposed between the stators 70 and 70′ is a rotor disc 110 constituted of a metal which has suitably high mechanical strength and suitably low electrical resistivity. Thus, the disc 110 may be constituted of, say, hard drawn copper, chrome copper, aluminum, brass or titanium. A hub portion 111 of the rotor surrounds a central rotor aperture 112 through which passes the free end 113 (of reduced diameter) of the shaft 63. Such hub portion 111 has an axial dimension greater than that of interstator gap 71.

The shaft end 113 and the rotor disc 110 are fixedly secured with each other in a manner as follows: Two collars 115 and 116 are fitted on the shaft end to lie on opposite sides of the hub 111. Both collars are locked to rotate with shaft 63 by a key 117 (FIG. 7) inserted into a keyway 118 formed by axial slots 119 cut into the collars and a registering axial slot 120 cut into the shaft end 113. The collars are drawn tight against the sides of hub 111 by equiangularly spaced axial bolts 121 passing through collar 115 and through holes 122 in the rotor hub 111 to be received in threaded holes 122a formed in the collar 116. The assembly of the rotor and the collars is then locked against axial movement on shaft end 113 by a nut 123 threaded onto the shaft end, and by a lock washer 124 which holds that nut in place. If desired, the collars 115, 116 may be made integral with the hub 111.

Outwardly of hub 111, the rotor 110 is tapered in axial cross section to diminish in thickness (with increasing radius) down to a thin annular web portion 130 disposed in inter-stator gap 71 midway between the stators 70 and 70' to be separated from the front faces 75 and 75' of the former and of the latter by, respectively, the small clearance rotor-stator gaps 131 and 131'. It is to be noted that, in the rotor shown in FIGS. 1 and 7, the web portion of the rotor is formed entirely of nonmagnetic material extending through 360° around the web portion.

Radially beyond the inter-stator gap 71, the web 130 of the rotor is joined by a taper (diverging radially outward) of the side faces of the rotor to a rotor rim portion 135. Bolted to opposite sides of such rim portions by axial bolts 136 are a pair of cast aluminum rings 137, 137' which are respective carriers of equiangularly spaced fan blades 138 and a similar set of fan blades 138'. If such rings and fans are made of magnetic material instead of aluminum, the material increases the reactance of the rotor rim to increase the starting impedance of the rotor to thereby produce increased starting torque in a manner alike to that by which such torque is increased by a double squirrel cage rotor of a conventional induction motor. In the disclosed embodiment, the fan blades are radially aligned (FIG. 7) so as to be effective to draw air for either direction of rotation of the rotor. Such blades may, however, be tilted for the purpose of increasing their air drawing capacity for one selected direction of rotor rotation. Further, such fan blades may be made integral parts of the rotor. Still further, the fan blades may be carried by the hub of the rotor instead of by the rim thereof.

The web 130 of rotor disc 110 has currents induced therein by the revolving magnetic fields generated by the stators 70 and 70'. Those currents in turn interact with the fields which induce them to produce rotation of rotor 110 in a manner analogous to that by which the current in an ordinary squirrel cage rotor produces rotation thereof. That is, for any slip between the speed of the rotor and the synchronous speed at which the magnetic fields revolve (3600 r.p.m. for two-pole fields and 60 cycle exciting current), the currents in rotor 110 exert on the rotor a driving torque which increases with slip over a range thereof starting at zero slip.

In connection with the driving of the rotor by the fields, it is of interest to note that, because the two fields are in opposed space phase relation, the two stator cores 72 and 72' are separate parts of a single magnetic circuit. To wit, considering flux which flows into inter-stator gap 71 from the top of the front face 75 of core 72, such flux follows a path as follows: Rightward from the top of front face 75 through rotor-stator gap 131, the rotor web 130 and the rotor-stator gap 131' into the top of stator core 72'; downward in that annular core 72' on either side of the central aperture therein to the bottom of core 72'; from such bottom left ward through rotor-stator gap 131', rotor web 130 and rotor-stator gap 131 into the bottom of core 72; and upward in that annular core 72 on either side of the central aperture therein back to the point of beginning at the top of the core. Thus, such flux traverses both of the two stator cores and both of the two rotor-stator gaps 131, 131'. Note that, when the stator windings are in an exact or (as later described) an approximate magnetic alignment axially, since they are connected in series aiding, they are in, what might be termed, a push-pull magnetic relation so as to aid each other in creating such flux.

As is well known, a current induced in a conductor by a magnetic field repels such conductor from the source of the field by a force which, to an approximation, is inversely proportional to the square of the distance between the conductor and the source. On the other hand, a piece of magnetic material is attracted to a source of magnetic field which, to an approximation, likewise varies inversely with the square of the distance between the source and the piece. In the disclosed motor, the stator cores 72, 72' are magnetic field sources, and the rotor web 130 is a conductor in which current is induced by the two fields from those two sources. Since the disclosed web 130 contains no magnetic material, it is not attracted to either stator core. The current induced in the rotor web does, however, produce a repulsion thereof from core 72 and, by symmetry considerations, a similar repulsion of the web from core 72'. Hence, the web 130 is acted upon by two oppositely directed repulsion forces. When the rotor web is midway between the stator cores 72, 72', the opposite repulsion forces thereon are of equal value, and, accordingly, the rotor 110 is balanced in respect to the axial magnetic forces to which it is subjected.

Assume now that, for some reason, the rotor web 130 undergoes a slight shift from its position of exact balance toward the stator core 72. Because the magnetic repulsive force between web 130 and core 72 is governed by the inverse square law, the value of the ratio of the post-shift strength to pre-shift strength of that force increases as a function of the amount of shift more rapidly than the value of the ratio of the pre-shift distance between elements 130 and 72 to the post-shift distance therebetween. Likewise, the value of the ratio of the post-shift to pre-shift strength of the repulsive force between web 130 and core 72' decreases more rapidly with shift of the web toward core 72 than the ratio of the pre-shift to post-shift distance between the web and core 72'. Hence, considering the net magnetic force exerted on rotor web 130 as a function of the amount of shift thereof from its reference position of exact balance (i.e., where the net magnetic force is zero), for a shift of the web in either direction from such reference position the net magnetic force thereon is always in a direction to urge the web back to reference position, and, furthermore, is of a magnitude which increases faster than linearly as the amount of shift increases. It follows that the oppositely directed repulsions exerted by stators 70 and 70' on rotor 110 tend to produce both a dynamically stable positioning of that rotor at the point where those two forces are equal in value and a dynamically stable balance of the magnetic forces acting thereon.

The rotor stability so attained gives rise to a number of advantages of which some are as follows: Considering the web 130 of the rotor as a deflectable member, the net repulsive force acting on such web tends to oppose any lateral deflection thereof rather than augmenting such deflection as such force would do if it were of attractive character. Also, such net repulsive force tends to damp out flutter in the rotating web rather than aiding such flutter as an attractive force would do. This being so, the mechanical strength of the web need not be relied upon to resist deflection and flutter, wherefore the web may be much thinner than if it were subjected to attractive forces. In fact, the web may be made so thin that it is less than half or three-quarters the thickness of the inter-stator gap 71. Thus, in one motor which was built, the web was 0.125 inch thick as compared to a thickness of 0.281 inch for the gap. In another motor which was built, the web was 0.050 inch thick in an inter-stator gap of 0.094 inch so as to occupy 53% of the width of the gap.

The elimination of magnetic material from the rotor web 130 serves to reduce rotor leakage reactance and surface losses in the rotor. It is to be understood, however, that the realization of a dynamically stable balance of magnetic forces on the rotor does not necessarily require that all magnetic material be eliminated from the web so that the only forces acting thereon are repulsive. More specifically, the web portion of the rotor may be partly constituted of magnetic material and still obtain the described dynamically stable balance of forces so long as the repulsive forces which act on the rotor are greater than the magnetic attractive forces which act thereon. Thus, for example, in certain applications it may be desirable for the electroconductive non-magnetic web means to have a thin cladding of magnetic material or to be divided into separate axial thicknesses by one or more thin sheets of magnetic material.

The fact that the rotor web of FIGS. 1 and 7 is imperforate and in the form of a unitary continuous sheet of homogeneous material adds to the strength in hoop tension of the web. From the electrical point of view, a web of such character is desirable since it provides the greatest cross section of low resistivity material to radial currents flowing in the rotor and, accordingly, the lowest resistance to such currents and the lowest copper loss resulting from flow of a given amperage of such currents.

The distribution of the currents of slip frequency induced in rotor 110 is shown in FIG. 7 by the lines 140 indicating the loop paths for those currents and by the arrows 141 indicating the direction of current flow in such loop paths. Considering a typical loop path 140a, the current therein flows radially in loop sections 142, 143 traversing rotor web 130, and circumferentially in the loop sections 144 and 145 lying in, respectively, the rim 135 and the hub 111 of the rotor. The active portions of loop 140a are those lying in web 130 in that those are the portions in which the current flowing through the loop is induced in the rotor, and in which such radially-flowing current does useful work by interacting with the magnetic fields to develop a force which is normal to the radial direction, and which, accordingly, creates a driving torque in the rotor. In contrast, the portions of loop 140a provided by the rim and hub are passive portions in that in them the loop current is not exposed to the main magnetic fields, and hence generates no torque but produces heat. Similarly, in all the other loop paths which pass through the hub and rim as well as through the web, the current in each path does useful work in the web but is wasted in the rim and hub.

A lowering of the resistance of the path for circumferential current flow in the outer periphery of the rotor is accomplished in the described motor by enlarging the radius of the rotor to provide therefor a rim portion disposed radially outwards of the inter-stator gap 71. Beyond this, however, the resistance of such path is further lowered by axially thickening such rim portion to have an axial dimension greater than that of the gap 71. In addition to reducing rotor power losses, the so-provided rim portion serves as a good mounting for the fan blades. Thus a rotor rim of the sort described is advantageous mechanically as well as electrically. The intimate contact between the outer rim and the fan blades improves the transfer of rotor heat to the air.

At the inner periphery of the rotor, the resistance of the path for circumferential current flow is lowered in the described motor by axial thickening of rotor hub 111. Such hub thickening is particularly useful in that the electroconductive cross section provided by the rotor for conducting radial current is a cross section which diminishes radially inwards, and, hence, the resistance of the rotor to such current would increase radially inwards unless the hub thereof were thickened. Mechanically speaking, the thickened hub portion is advantageous because it stiffens the rotor web 130 against lateral deflection.

Referring now to FIG. 6, because the front faces 75, 75' of the stator cores 72, 72' are broken up into slots and intervening teeth rather than being continuous, the fields produced by the cores have harmonics introduced therein by the slot discontinuities. Such harmonics are undesirable in that they are the cause of a substantial power loss in the rotor. It has been found, however, that such harmonics can be considerably reduced by changing the relative angular position of the two stators from that shown in FIG. 4 wherein the slots of the same number in the two stators are directly opposite each other to the position shown in FIG. 6 wherein the same numbered slots of the two stators are in angular misregistration and, accordingly, the fields produced by the two stators depart somewhat from an exact out of phase relation.

In FIG. 6, the angular misregistration between the two stators is ½ slot pitch. That is, slot number 1 of stator 70' is angularly displaced from slot number 1 of stator 70 by half of the angular width between centers of any two adjacent slots. As shown by FIG. 8, a misregistration of ½ slot pitch reduces the power loss from harmonics by about 50%. It might be assumed that such a decrease in harmonic loss is caused by the geometric consideration that, irrespective of how the stators are wound, for ½ slot pitch displacement of the two arrays of slots on the stators, those arrays have their greatest possible angular misregistration. This is not the only explanation, however, since for a shifting of one slot pitch in the angular position of the two stators, their respective slot arrays are in alignment (i.e., slot number 1 of stator 70' is directly opposite another slot, namely, slot number 2 of stator 70), and yet (FIG. 8) a substantial reduction in harmonic loss is still obtained. Therefore, such harmonic loss reduction is partly (or perhaps wholly) attributable to the departure from exact opposed phase relation of the respective magnetic fields produced by the two stators. While FIG. 8 shows that the amount of such departure has a substantial range over which the harmonic loss is diminished, the range is less than the angular interval occupied by one coil side group since, for a departure greater than that interval, there would be no angular overlap at all between, say, the coil side group $a_{ni}$ on stator 70 and its complementary coil side group $a_{si}$ on stator 70'.

Figure 9:
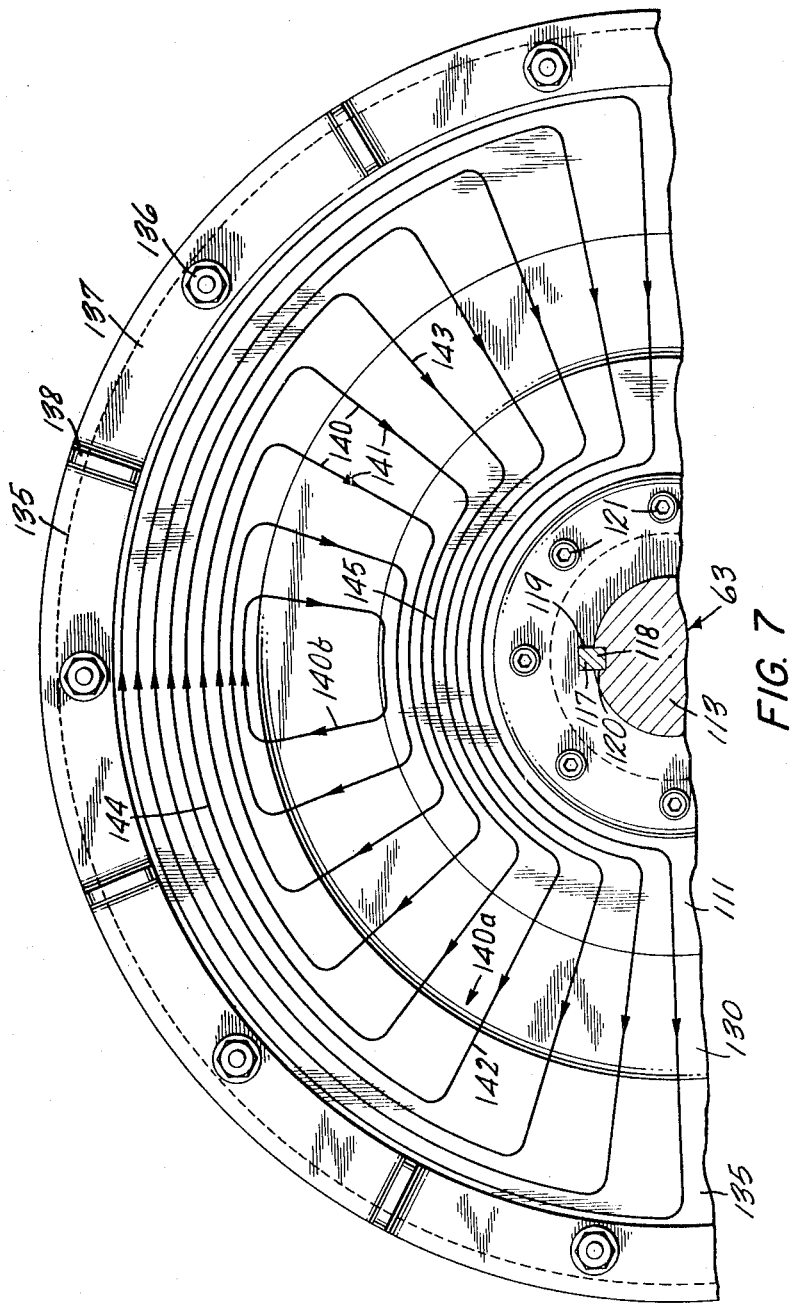
FIG. 9 is a fragmentary view of a modification of the rotor of the FIG. 1 motor.

Harmonic losses in the rotor may be further reduced by the modification shown in FIGURE 9 wherein the web portion 130 of the rotor 110 is perforated by a plurality of narrow slots 150 containing inserts 151 of epoxy resin or of other material having a high electrical resistivity relative to the web material, but having high mechanical strength internally and an adherence bond of high strength to each of the opposite sides of the slot filled by the insert.

Coming to the action (as the rotor spins) of the fan blades 138, 138' (FIG. 1), the left hand blades 138 draw cooling air through the left hand side of the motor by way of a path 160 wherein the air passes through the inlet ports 44, over the exterior cylindrical surface of stator 70, and out of the motor through outlet vent 41. The same left hand blades 138 also draw cooling air through another path 161 wherein the air enters the motor through inlet ports 49, passes over the interior cylindrical surface of stator 70, and is then drawn outwardly through the radial passageways 82 in the stator slots (FIG. 5) to be vented from the motor through the same vents 41 as are employed for air path 160. The right hand fan blades 138' similarly cool the right hand side of the motor by drawing air through the paths 160', 161' which are right hand counter-parts of the already described paths 160, 161.

A double axial air gap motor in accordance with the invention has been built and has operated successfully. In that motor (with two-pole fields), some of the dimensions (in inches) of the motor were: outer diameter of rotor—19.00; outer diameter rotor web portion—14.25; inner diameter web portion—9.00; thickness of web—0.125; clearance between web and stator faces—0.078; thickness of rotor rim—0.375; thickness of rotor hub—0.484; mean diameter stator core—11.265; slot pitch on mean diameter of stator core—1.22; width of stator slot openings into rotor stator gap—0.187; depth of radial air passageways in slots—0.265. Based on a rated load of 75 h.p, the motor had (without a fan) the following operating characteristics at 440 v., 60 cycles: full load speed—3470 r.p.m.; maximum torque—300% of full load torque; starting torque—150% of full load torque; starting curent—550% of full load current; full load current—108 amperes; full load power factor—82%; full load efficiency—83.7%.

As earlier discussed in connection with FIGS. 6 and 8 an appropriate misregistering of corresponding elements of the two stators has proven effective in reducing rotor losses due to the main field pulsations caused by the stator slot openings. The fields, however, still contain magnetomotive force (M.M.F.) harmonics which generally diminish in amplitude relative to the fundamental as the order of the harmonic increases. With respect to those harmonics the rotor acts as an electromagnetic shield, and the stators produce surface losses in the two rotor faces independently.

It has been found that the described M.M.F. harmonics can be reduced by dividing the overall winding on each stator into two fractional-pitch polyphase distributed windings, both windings being fed by the same phases and overlapping each other through 360°, and the two windings being disposed on the stator to have a relative angular displacement equivalent to a fractional coil pitch. When a stator is so wound, the strength of each M.M.F. harmonic relative to the fundamental will be reduced from its original value in accordance with a multiplying factor (less than 1.0) which is equal to the product of the pitch factor of the pitch of the coils of each winding and the pitch factor corresponding to the angular displacement of the two windings. By selecting an appropriate pitch for such coils and an appropriate inter-winding angular displacement, the associated pitch factors can be made to be of such values that the strength relative to the fundamental of the lower order e.g., 5th, 7th, 11th, 13th) M.M.F. harmonics (which are the most serious sources of loss) can be greatly reduced as compared to the strength relative to the fundamental which those lower order harmonics would have if the overall stator winding were in effect a conventional single polyphase winding. In fact, it is possible by the described winding arrangement to virtually eliminate as a practical matter the component of loss attributable to the mentioned M.M.F. harmonics. Such can be done in single axial air gap motors as well as double gap motors and, in the latter, whether or not there is present the previously described misregistration between corresponding elements of the two stators.

As an example, a large experimental double axial air gap motor with 60 slots per stator had each stator wound with two windings, the coils of each being pitched 57%, and the two windings being displaced from each other by 20% of a pole pitch so as to have by that displacement an equivalent 80% coil pitch. The resultant pitch factors are as follows:

| Harmonic | 57% Pitch Factor | 80% Pitch Factor | Overall Pitch Factor |
| --- | --- | --- | --- |
| 1 | .784 | .952 | .745 |
| 5 | .978 | 0 | 0 |
| 7 | 0 | .588 | 0 |
| 11 | .454 | .952 | .43 |
| 13 | .767 | .574 | .44 |

It was found that the losses in that motor due to the described M.M.F. harmonics were, as a practical matter, zero.

Figure 10:
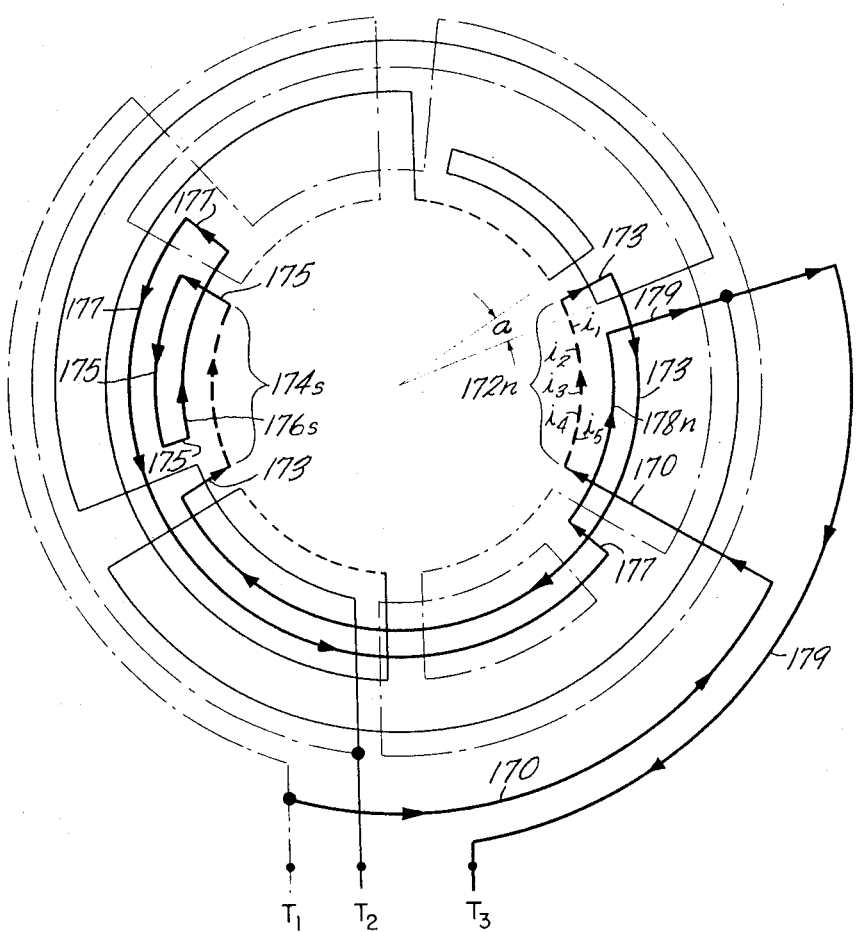
FIG. 10 is a schematic diagram of a modified stator winding configuration for the motor.

FIG. 10 shows schematically a two-pole three-phase, single circuit, delta stator winding which is divided into an inner winding half and an outer winding half in the manner just described. While the overall stator winding which is represented is in practive arranged so that each slot contains the inner sides of two coils and above them the outer sides of two coils (four coil sides per slot), FIG. 10 for convenience of illustration omits any schematic showing of the outer coil sides.

The shown winding arrangement will be better understood by tracing at a given instant the flow of current of the phase between, say, terminals $T_1$ and $T_3$. Such current may be assumed to flow from $T_1$ by way of connection 170 through a group 172n of five fractional-pitch, lap wound coils which together produce, say, "north" flux at the instant considered. The five shown inner active sides $i_1$–$i_5$ of these five coils belong to the inner winding half of the stator winding and are each received in order in a corresponding one of five successive stator slots.

From the coil group 172n the current flows by way of connection 173 through a group 174s (represented by a dashed line arc) of five fractional-pitch lap wound coils and then (by way of connection 175) through another group 176s (represented by a solid line arc) of five fractional-pitch lap wound coils. The coil groups 174s and 176s each produces, say, "south" flux at the instant considered. As schematically shown, the inner active coil sides of the five coils of group 174s belong to the inner winding half of the stator winding and are each received in order in a corresponding one of five successive stator slots to be the bottom ones of the coil sides in those slots, whereas the inner active coil sides of group 176s belong to the outer winding half of the stator winding and are received in order in a corresponding one of five successive stator slots to be second from the bottom in the last named slots.

The inner coil sides of the coil group 174s are positioned directly opposite the inner coil sides of coil group 172n. Comparing the relative positions of coil groups 174s and 176s, the stator arc occupied by the inner coil sides of group 176s is angularly displaced by the shown angle $a$ (in this instance 12°) from the stator arc occupied by the inner coil sides of the coil group 174s. In other words, the outer winding half of the stator winding is, overall, displaced by angle $a$ from the inner winding half of the stator winding.

From coil group 176s the current flows by way of connection 177 to a group 178n (represented by a solid line arc) of five coils producing "north" flux at the instant considered. As is clear, the coil group 178n is the "north" counterpart of the "south" coil group 176s. That is, the five inner coil sides of group 178n are directly opposite those of group 176s and are like those of group 176s in that they belong to the outer winding half of the stator winding and are laid in five successive stator slots to be the coil sides therein which are second from the bottom.

From the coil group 178n the current for the considered phase flows by way of connection 179 to terminal $T_3$ to thereby complete the circuit through the stator winding for that phase. From the description which has been given, the circuits through the stator winding for currents of the other two phases should be apparent.

A disadvantage of the FIG. 10 winding is that it is expensive because it is a double or "four-layer" winding having twice as many coils and connections per stator slot as a single or "two-layer" winding. This disadvantage may be largely overcome while obtaining equivalent harmonic suppression by the winding configuration of FIG. 11. While that configuration is shown as applied to a stator of twenty-four slots, the same configuration may be employed with stators having a different number of slots as, say, the thirty-slot stators 70 and 70' of the FIG. 1 motor.

Figure 11:
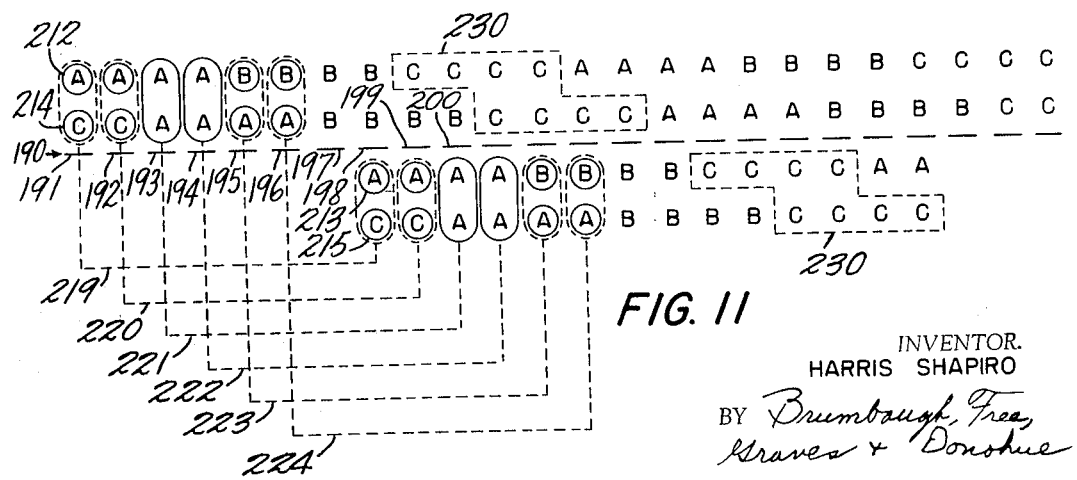
FIG. 11 is a developed schematic diagram of another modified stator winding configuration for the motor.

In FIG. 11, each of the dashes in dash line 190 represents one of the slots of the twenty-four slot stator. The spaces above and below each dash respectively represent the top half and the bottom half of the slot corresponding to the dash. In the diagram, the "A," "B" and "C" symbols represent the active coil sides of electrical whole coils or half coils inserted into the slots and energized by currents of phases *a*, *b* and *c*, respectively. Each such symbol corresponds to a straight line slot-contained section of fourteen turns of wire. The pattern of symbols below line 190 is a repetition of the pattern of symbols above that line excepting that the lower pattern is displaced seven slots from the upper one and, for convenience of illustration, some of the symbols of the lower pattern have been omitted.

Considering the slot 191 at the left hand side, the top of this slot contains one side of a mechanical coil represented by the dash line 219. The other side of coil 219 lies in the bottom of slot 198 which is seven slots to the right of 191. Because the two sides of coil 219 are spaced seven slots apart in a twenty-four slot stator, the pitch of the coil is $7/12$ or 58.3%. Coil 219 is thus a fractional-pitch coil.

The coil 219 has 28 turns of wire which, mechanically speaking, are bound together or otherwise associated into a single "bundle." Electrically speaking, however, the coil 219 is divided into two half-coils which are electrically discontinuous with each other, and which are each constituted of fourteen turns of wire. Those two half-coils are respectively energized by current of phase *a* and current of phase *c*. The phase *a* half-coil of coil 219 has two active coil sides designated as 212 and 213, whereas the phase *c* half-coil of coil 219 has two active coil sides designated as 214 and 215. As shown, coil sides 212 and 214 are in the top of slot 191 whereas coil sides 213 and 215 are in the bottom of slot 198.

To the right and next to coil 219 is a like coil 220 which is also a single mechanical coil but is electrically divided into two half-coils each having fourteen turns of wire. As before, the two half-coils of coil 220 are respectively energized by phase *a* current and by phase *c* current.

The coil 220 is succeeded by a coil 221 which is both mechanically and electrically a single coil constituted of twenty-eight turns of wire. Coil 221 is energized by phase *a* current. Coil 221 is succeeded by a like phase *a* coil 222. To the right of that last named coil is a coil 223 which is mechanically a single coil but is electrically subdivided into two fourteen turn half-coils of which the upper one carries phase *b* current and the lower one carries phase *a* current. A coil 224 alike to 223 is immediately to the right of coil 223.

The "A" electrical whole coils and half-coils in the mechanical coil set 219–224 are connected in lap-wound manner from left to right to form an electrical "A" coil group spanning six stator slots. When, at a particular instant, "north" current is carried by the "A" elements of set 219–224 which are above line 190, "south" current is carried by the "A" elements of that set, which are below line 190.

The "B" electrical half-coils of mechanical coils 223 and 224 are left hand members of a six-slot "B" electrical lap-wound coil group which overlaps in slots 195 and 196 with the previously described "A" group. The "B" group is, as a lap wound series of electrical whole coils and half coils, a duplicate of the earlier described "A" group. Such "B" group is energized by phase *b* current such that, at the mentioned instant, the slot-contained elements of the "B" group above and below line 190 are energized by, respectively, "south" current and "north" current.

From the mentioned "B" group, the FIG. 11 winding continues from left to right with a six-slot "C" group 230 and subsequent "A," "B" and "C" groups. Considering all of the six-slot electrical groups which so form the winding of FIG. 11, those groups are so energized by currents of appropriate phase so that, from left to right, the groups alternate between "north" and "south" with respect to the direction (radially inward or radially outward) through which current flows at any given instant in the coil and half coil sides above line 190. Thus, for example, when "north" current flows through the "A" elements, which are above line 190 and in slots 191–196, "south" current flows through the "B" elements which are above line 190 and are in slots 195–200.

To summarize the foregoing, the FIG. 11 winding is comprised of twenty-four mechanically separate coils of which each coil has a fractional pitch of $7/12$ or 58.3%. Of those twenty-four mechanical coils, some are electrical whole coils, and others are electrically divided into two half-coils. The electrical whole coils and half coils are distributed and connected to form six lap-wound, six-slot electrical coil groups which are energized in rotation by current of phase *a*, phase *c*, and phase *b*. Each such coil group overlaps through two slots with the group to the left thereof and with the group to the right thereof. As shown, the overlaps produce a variation in the distribution among the stator slots of the turns of wire per slot which carry currents of any one phase. Because each such overlap extends over two slots of a twenty-four slot stator, the single winding of FIG. 11 is the equivalent of a double winding (like that of FIG. 10) having an angular displacement between its separate windings of 83% ($10/12$ or two slots displaced).

The conjunction in the FIG. 11 winding of a coil pitch of 57% and of an equivalent winding pitch of 83% serves like the FIG. 10 winding (and for the reasons explained in connection with FIG. 10) to provide a suppression of M.M.F. harmonics which is so effective that the rotor loss due to those harmonics is negligible. The FIG. 11 winding configuration is however preferable to that of FIG. 10 because, for an equal number of stator slots, the FIG. 11 configuration employs only half as many mechanical coils as and a lesser number of electrical coil connections than the FIG. 10 configuration.

As earlier pointed out, considering the web 130 of rotor 110 as a deflectable member, the net repulsive force on the web tends to oppose any lateral deflection thereof rather than augmenting such deflection as such force would do if it were to be of an attractive character. If, therefore, in the described machine the size of the rotor-stator gaps is chosen solely on the basis of the mechanical consideration that the gaps must be large enough to prevent a deflection of the rotor from bringing it into contact with one of the stators, the presently described motor with its repelled rotor can incorporate much smaller rotor-stator gaps than a comparable motor in which the rotor is attracted. From the electrical point of view, it would ordinarily be presumed advantageous to reduce the size of the rotor-stator gaps to a small value or even down to zero because any reduction in gap size would decrease the reluctance of the path for the flux which provides the rotating fields.

I have found, however, that, in the case of a repelled rotor, double axial air gap motor of the sort described, it is not necessarily desirable to reduce the size of the rotor-stator gaps to the minimum necessitated by mechanical considerations. Instead, I have found for such a motor that the size of the rotor-stator gaps should ordinarily be greater than that which would be good engineering practice from the purely mechanical point of view, and that, further, the optimum size or range of size for the rotor-stator gaps is determined primarily by electrical rather than mechanical considerations. This is so for reasons as follows.

The total stray rotor losses (i.e., rotor losses other than normal slip loss) can be divided into two components of which the first is caused by the space harmonics manifested in the M.M.F. wave as a result of the stator slotting and because the M.M.F. waveform is not exactly sinusoidal. That first component can, as already discussed, be reduced to insignificant levels by the employment of phase displaced stators and the special winding configurations shown in FIGS. 10 and 11.

The second component of stray rotor loss is attributable to the slot opening reluctance losses produced by flux pulsations in the main wave linking the rotor. I have found, however, that those reluctance pulsation losses can be kept lower than others of the losses (e.g., stator copper loss, slip loss or coil loss) by suitably controlling the reluctance pulsations seen at the electroconductive surface of the rotor.

More specifically, tests have shown a direct and pronounced relationship between the mentioned reluctance losses and the Carter factor at the surface of the electroconductive web portion of the rotor. The Carter factor is, in turn, a function of the ratio of the stator slot opening width S to the width or size $g$ of the flux gap between the magnetic material of the stator and the electroconductive material of the rotor. For convenience, such ratio is hereinafter referred to as the $S/g$ ratio. Its significance is that, as the $S/g$ value decreases, the reluctance pulsation loss also decreases.

In theory, the $S/g$ ratio can be decreased either by decreasing the slot opening width S or by increasing the rotor-stator gap width $g$. As a matter of practice, however, S cannot be made any smaller than the slot opening width required to thread the turns of wire into the slots. A slot opening width of this minimum practical value is ordinarily utilized in building a double axial gap motor of the sort described. A decreasing of the $S/g$ ratio value is, therefore, realized in practice by increasing the rotor-stator gap width $g$.

The diagram of FIG. 12 illustrates by line 240 the functional relationship between the reluctance pulsation loss and $S/g$. In the diagram, the vertical ordinate represents electrical loss in arbitrary units, and the horizontal ordinate represents the value of $S/g$. As indicated by the arrow 241, $S/g$ decreases as the rotor-stator gap width increases.

As shown by line 240, for a gap width which is so small as to give an $S/g$ ratio greater than 5, the reluctance pulsation loss is very high and, in fact, has a value exceeding other motor losses (not individually shown in FIG. 12) such as the stator copper loss, slip loss or core loss. As the gap width progressively increases to reduce $S/g$ below 5 and to even lesser values, the reluctance pulsation loss progressively decreases towards zero. Therefore, considering the reluctance pulsation loss alone, such loss can be made very small by utilizing a gap width so large as to make $S/g$ very small.

As another consideration, however, increasing the gap width serves to increase the reluctance of the magnetic flux path so as to increase the magnetizing current which has to be drawn by the motor to produce the same shaft output as before. Such increase in magnetizing current in turn increases the stator copper loss of the motor at rated load. If, therefore, the gap width is greatly increased, no net advantage is realized because the benefit of the decrease in reluctance pulsation loss provided by the increase in gap size is nullified by a significantly larger increase in copper stator loss at rated load or by a reduction of magnetizing impedance which is so great that a significant reduction in machine output results.

Reference is now made in FIG. 12 to the line 242 which is a generalized graph of the total motor loss at rated load as a function of $S/g$, the vertical scale for line 242 not necessarily being the same as for line 240. As shown, the graph 242 has a minimum point 243 at a median value for $S/g$. As $S/g$ is increased above such median value by decreasing the gap width $g$, the loss curve 242 slopes upwardly from point 243 because the component of total loss due to reluctance pulsation loss is increasing faster with decreasing $g$ than other losses (as, say, stator copper loss) are decreasing. On the other hand, as $S/g$ is decreased below such median value by increasing the gap width $g$, the curve 242 also slopes upwardly from point 243 because the component of total loss due to factors other than reluctance pulsation is increasing faster with increasing $g$ than the reluctance pulsation loss is decreasing. Accordingly, there is restricted range of values for $S/g$ within which the total motor loss at rated load is optimally reduced. The lower and upper end points of that range are indicated in FIG. 12 as being at about the $S/g$ values of 1.0 and 5.0. Those particular values are the approximate end points of the optimum $S/g$ range for reasons as follows.

First, it should be noted that, in designing a motor, there are many considerations other than obtaining the exact minimum in total motor loss at rated load, and that those other design considerations may result in an $S/g$ ratio value which departs somewhat from that corresponding to the minimum loss point. For example, in some applications it may be desirable to have an $S/g$ value less than that yielding minimum total motor loss at rated load in order to secure the advantage of a particularly low value of magnetizing current as a percentage of the full current at rated load. Thus, there are $S/g$ values which are optimum for particular motor applications but which are displaced from the value yielding the minimum loss point.

Experiments and calculations indicate, however, that, taking all design considerations into account, the optimum values for the $S/g$ ratio all lie within the range between 1 and 5. Specifically, for a large (125 H.P.) double axial air gap motor with a bare repelled solid electroconductive rotor and a slot opening width of 0.090″, the practical maximum magnetic gap from the magnetic surface of each stator to the rotor was found (by calculation) to be 0.08″. The minimum practical value for the $S/g$ ratio was, therefore, 1.1. A small (4 H.P.) motor of similar construction was built with a slot opening of 0.060″ and an acceptable maximum rotor-stator gap of 0.025″. The $S/g$ ratio value was 2.4, and that value for $S/g$ was found to be very satisfactory. Moreover, experiments were conducted on a large repelled rotor double axial air gap motor with a slot opening width of 0.25″ and rotor-stator gaps of 0.025″, the $S/g$ ratio being 10. Reluctance pulsation losses were so high that the machine could only be run for a few minutes, the loss being about 25 kw. compared to 2 kw. for the same size machine with an $S/g$ ratio of 2.4. The last mentioned experiments further showed that the maximum practical value for $S/g$ ratio is 5.

From such calculations and experiments, it is evident that the value of 5 is a cut-off point for the high end of $S/g$ range because, as the gap width $g$ decreases to bring $S/g$ above 5, the reluctance losses become of critical importance in that they start to exceed other important motor losses such as stator copper loss, slip loss or coil loss. At the low end of the range, the $S/g$ value of 1 is a cut-off point because, as $g$ increases to decrease $S/g$ below 1, the total motor loss rises to a value which is about the same as at the high end of the range and which therefore, is excessive.

The curve 242 is a generalized curve rather than a curve for total motor loss at rated load which is based on test data obtained from some specific motor. In practice, the shape of the total loss curve and the $S/g$ value at which the curve has minimum value will vary from motor to motor in dependence on factors other than $S/g$ ratio, one such factor being the ratio of the width of the inter-stator flux gap to that of the rotor-stator flux gap. Hence, the shown curve 242 is representative of a whole family of curves produced by the plotting of separate sets of test data obtained from a number of different motors. Tests and calculations indicate, however, that, for all the curves in such family, the minimum loss point for the curve falls within the range of $S/g$ values extending from about 1 to about 5.

It is to be noted that the discussed gap width $g$ is the size of the gap between the magnetic material of the stator and the electroconductive material of the annular portion of the rotor which is in the inter-stator gap. In other words, $g$ is the size of the rotor-stator "flux" gap in that it is the length of the path over which flux from the stator encounters high reluctance in passing from the stator to the electroconductive portion of the rotor in which driving current is induced. In the instance where the front face of the stator has no covering of non-magnetic material and the rotor has no covering of electrically non-conductive material, the rotor-stator flux gap is the same in size as the rotor-stator air gap. Such air gap is however smaller than such flux gap when one or the other or both of such coverings are present. One of the advantages of an $S/g$ ratio in accordance with the present invention is that, in addition to lowering reluctance pulsation loss, it provides between the magnetic material of the stator and the mentioned electroconductive portion of the rotor an axial spacing which is large enough to permit one or the other or both of the stator and rotor to be covered with a layer of, say synthetic resinous material (for, say, protective purposes) while still obtaining a rotor-stator air gap or clearance which is adequate from the mechanical point of view.

The above described embodiments being exemplary only, it is to be understood that additions thereto, omissions therefrom and modifications thereof can be made without departing from the spirit of the invention, and that the invention comprehends embodiments differing in form and/or detail from those specifically described. For example, the winding configurations of FIGS. 10 and 11 and an $S/g$ ratio of a value within the described optimum range therefor may be employed to advantage alone or together in axial air gap motors irrespective of whether they are single or double gap motors and irrespective of wherther the rotors of the motors are attracted to or repelled from the stator or stators.

Accordingly, the invention is not to be considered as limited save as in consonant with the recitals of the following claims.

I claim:

1. In an axial air gap polyphase induction motor comprised of at least one stator having polyphase winding means comprised of fractional-pitch coils comprised of turns of wire received in each of a plurality of radial slots in said stator, said stator being axially spaced by a gap from a rotor and being responsive to current energization of said winding means to produce a magnetic field rotating in said gap, and said rotor being responsive to said field to undergo rotation, in combination with said motor the improvement comprising an electrical connection of the turns of wire in the slots in said stator into different phase groups of which the turns which constitute each group are spread over consecutive slots and have a variable distribution among said consecutive slots with respect to the number of turns of wire in each slot, each such variable distribution being characterized by a lesser number of turns per phase per slot in slots at the ends of said distribution than in slots intermediate those end slots, and the variable distribution of turns per slot within each such group and the fractional-pitch of said coils together providing for M.M.F. harmonics in said field an overall pitch factor less than the individual pitch factor provided by the fractional coil pitch.

2. The improvement as in claim 1 in which said overall pitch factor is less than 0.5 for each of the fifth, seventh, eleventh and thirteenth M.M.F. harmonics in said field.

3. In a double axial air gap polyphase induction motor comprised of two stators spaced by an axial interstator gap and having respective polyphase winding means each comprised of fractional-pitch coils comprised of turns of wire received in each of a plurality of radial slots in the corresponding stator, said stators being responsive to current energization of said winding means to produce respective magnetic fields rotating in magnetic push pull relation in a common direction around said gap, and said motor further comprising a rotor in said gap and responsive to said fields to undergo rotation and to be repelled as a whole from each of said stators, in combination with said motor the improvement comprising electrical connections of the turns of wire in the slots of each stator into different phase groups of which the turns which constitute each group are spread over consecutive slots and have a variable distribution among said consecutive slots with respect to the number of turns of wire in each slot, each such variable distribution being characterized by a lesser number of turns per phase per slot in slots at the ends of said distribution than in slots intermediate those end slots, and; the variable distribution within each such group of the turns per slot and the fractional pitch of said coils together providing for M.M.F. space harmonics in said fields an overall pitch factor less than the individual pitch factor provided by the fractional coil pitch.

4. In a double axial air gap polyphase induction motor comprised of two stators spaced by an axial interstator gap and having respective polyphase winding means each comprised of fractional pitch coils comprised of turns of wire received in each of a plurality of radial slots in the corresponding stator, said stators being responsive to current energization of said winding means to produce respective magnetic fields rotating in magnetic push pull relation in a common direction around said gap, and said motor further comprising a rotor in said gap and responsive to said fields to undergo rotation and to be repelled as a whole from each of said stators, in combination with said motor the improvement in which the polyphase winding means of each stator is comprised of first and second 360° whole coil windings disposed in superposed relation in the slots of said stator to have a relative angular displacement equivalent to a fractional coil pitch each of said windings being electrically connected to subdivide the turns of wire thereof into groups of different phase of which each is spread over consecutive slots and is partly in overlapping relation and partly in non-overlapping relation with the phase group of the other winding which is of the same phase and reference direction of current flow, said overlapping non-overlapping relation together with the fractional-pitch of said coils providing for M.M.F. space harmonics in said fields an overall pitch factor less than the individual pitch factor provided by said fractional coil pitch.

5. In a double axial air gap polyphase induction motor comprised of two stators axially spaced by an interstator gap and having respective polyphase winding means each comprised of fractional-pitch coils comprised of turns of wire received in each of a plurality of radial slots in the corresponding stator, said stators being responsive to current energization of said winding means to produce respective magnetic fields rotating in magnetic push pull relation in a common direction around said gap, and said motor further comprising a rotor in said gap and responsive to said fields to undergo rotation and to be repelled as a whole from each of said stators, in combination with said motor the improvement in which the polyphase winding means of each stator is a single winding of mechanical coils received in said slots of such stator, at least some of said mechanical coils being each subdivided into a plurality of electrical coils in accordance with a predetermined repetitive pattern of subdivision around such stator, and said improvement further comprising an electrical connection of the electrical coils in such winding into different phase groups around such stator, each such group being spread over consecutive stator slots in angularly overlapping relation with the groups to either side thereof to provide for the turns of wire which constitute each such group a variable distribution among said consecutive slots with respect to the number of turns of wire in each slot, each such variable distribution being characterized by a lesser number of turns per phase per slot in slots at the ends of said distribution than in slots intermediate those end slots, and; the variable distribution within each such group of the turns per slot and the fractional pitch of said coils together providing for M.M.F. harmonics in said fields an overall pitch factor less than the individual pitch factor provided by said fractional coil pitch.

6. In a double axial air gap polyphase induction motor comprised of polyphase wound stators axially spaced by a radially annular interstator gap and each comprised of magnetic material having formed therein radial slots with openings towards said gap, said motor also being comprised of a rotor having an annular portion disposed in said gap and comprised of electroconductive material so as to be responsive to energization of said stators to undergo rotation and so as to be repelled from each stator, in combination with said motor the improvement comprising a set axial spacing of said rotor from each stator in an amount which renders of a value in the range between and including 1.0 and 5.0 the ratio of the width of ones of said slot openings of such stator to the axial distance between said magnetic material of such stator and said electroconductive material of said annular rotor portion.

7. In an axial air gap polyphase induction motor comprised of a rotor and at least one slotted stator having polyphase winding means comprised of fractional-pitch coils, the improvement comprising a variable distribution among consecutive stator slots in the wire turns per slot per phase constituting each phase group of said winding means, each such variable distribution being characterized by a lesser number of turns per phase per slot in slots at the ends of said distribution than in slots intermediate those end slots, and said variable distribution and the fractional-pitch of said coils providing for M.M.F. harmonics in the field generated by said stator an overall pitch factor less than the individual pitch factor provided by the fractional coil pitch.

References Cited by the Examiner
UNITED STATES PATENTS

| | | | |
|---|---|---|---|
| 547,069 | 10/1895 | Gorges | 310—268 |
| 935,941 | 10/1909 | Steinmetz | 310—202 |
| 1,530,466 | 3/1925 | Macmillan | 310—202 |
| 2,727,163 | 12/1955 | Meyer | 310—77 |
| 3,200,277 | 8/1965 | Kober | 310—268 |

MILTON O. HIRSHFIELD, *Primary Examiner.*

ORIS L. RADER, *Examiner.*

L. L. SMITH, *Assistant Examiner.*